United States Patent
Kvochko

(10) Patent No.: US 11,368,289 B1
(45) Date of Patent: Jun. 21, 2022

(54) VIDEO REGISTRATION AND AUTHENTICATION USING BLOCKCHAIN

(71) Applicant: Bank of America Corporation, Charlotte, NC (US)

(72) Inventor: Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 339 days.

(21) Appl. No.: 16/841,176

(22) Filed: Apr. 6, 2020

(51) Int. Cl.
  *H04L 9/06* (2006.01)
  *G06F 16/71* (2019.01)
  *G06V 20/40* (2022.01)
  *H04L 9/00* (2022.01)

(52) U.S. Cl.
  CPC ............ *H04L 9/0643* (2013.01); *G06F 16/71* (2019.01); *G06V 20/49* (2022.01)

(58) Field of Classification Search
  CPC ........ H04L 9/0643; G06F 16/71; G06V 20/49
  See application file for complete search history.

(56) References Cited

U.S. PATENT DOCUMENTS

| | | | |
|---|---|---|---|
| 5,842,191 A | 11/1998 | Stearns | |
| 9,659,185 B2 | 5/2017 | Elovici et al. | |
| 9,849,364 B2 | 12/2017 | Tran et al. | |
| 9,948,467 B2 | 4/2018 | King | |
| 10,262,236 B2 | 4/2019 | Lim et al. | |
| 10,333,721 B2 | 6/2019 | Uhr et al. | |
| 10,361,866 B1 | 7/2019 | McGregor et al. | |
| 10,572,684 B2 | 2/2020 | LaFever et al. | |
| 11,044,100 B2* | 6/2021 | Deery | H04L 9/3236 |
| 2014/0316984 A1 | 10/2014 | Schwartz | |
| 2015/0278820 A1 | 10/2015 | Meadows | |
| 2016/0072800 A1 | 3/2016 | Soon-Shiong et al. | |
| 2016/0098723 A1 | 4/2016 | Feeney | |
| 2016/0277439 A1 | 9/2016 | Rotter et al. | |
| 2016/0283920 A1 | 9/2016 | Fisher et al. | |
| 2016/0300234 A1 | 10/2016 | Moss-Pultz et al. | |
| 2017/0017936 A1 | 1/2017 | Bisikalo et al. | |
| 2017/0017954 A1 | 1/2017 | McDonough et al. | |
| 2017/0017955 A1 | 1/2017 | Stern et al. | |
| 2017/0132625 A1 | 5/2017 | Kennedy | |
| 2017/0132626 A1 | 5/2017 | Kennedy | |
| 2017/0140408 A1 | 5/2017 | Wuehler | |

(Continued)

FOREIGN PATENT DOCUMENTS

WO  WO 2018/222222  12/2018

*Primary Examiner* — Nnenna N Ekpo

(57) ABSTRACT

A system includes a registration server and an authentication server. The registration server receives a source video and splits it into a series of segments that includes a first segment. The registration server generates a first hash from the first segment and stores it in a block in a blockchain. The registration server stores an identifier for the block in the first set of metadata. The authentication server receives a request to authenticate a target video and splits it into a series of segments that includes a first segment, corresponding to the first segment of the source video. The authentication server generates a second hash from the first segment. The authentication server determines that the second set of metadata includes the identifier and uses it to locate the block in the blockchain. The authentication server determines that the second hash does not match the first hash and transmits an alert.

20 Claims, 8 Drawing Sheets

(56) References Cited

U.S. PATENT DOCUMENTS

| | | |
|---|---|---|
| 2017/0206523 A1 | 7/2017 | Goeringer et al. |
| 2017/0228731 A1 | 8/2017 | Sheng et al. |
| 2017/0236123 A1 | 8/2017 | Ali et al. |
| 2017/0257358 A1 | 9/2017 | Ebrahimi et al. |
| 2017/0330174 A1 | 11/2017 | Demarinis et al. |
| 2018/0096175 A1 | 4/2018 | Schmeling et al. |
| 2018/0117447 A1 | 5/2018 | Tran et al. |
| 2018/0121635 A1 | 5/2018 | Tormasov et al. |
| 2018/0133583 A1 | 5/2018 | Tran et al. |
| 2018/0137512 A1 | 5/2018 | Georgiadis et al. |
| 2018/0268222 A1 | 9/2018 | Sohn et al. |
| 2018/0285879 A1 | 10/2018 | Gadnis et al. |
| 2018/0341878 A1 | 11/2018 | Azout et al. |
| 2019/0122072 A1 | 4/2019 | Cricri et al. |
| 2019/0130190 A1* | 5/2019 | Raspotnik, Jr. ......... H04L 63/08 |
| 2019/0147333 A1 | 5/2019 | Kumar et al. |
| 2019/0207768 A1 | 7/2019 | Hardy et al. |
| 2019/0236614 A1 | 8/2019 | Burgin et al. |
| 2019/0278378 A1 | 9/2019 | Yan et al. |
| 2019/0303551 A1 | 10/2019 | Tussy |
| 2019/0311148 A1 | 10/2019 | Andrade |
| 2019/0355128 A1 | 11/2019 | Grauman et al. |
| 2019/0358515 A1 | 11/2019 | Tran et al. |

* cited by examiner

VIDEO REGISTRATION AND AUTHENTICATION USING BLOCKCHAIN

TECHNICAL FIELD

This invention relates generally to information security, and specifically to video registration and authentication using blockchain.

BACKGROUND

Recently, generative machine learning algorithms have made it increasingly easy to generate synthetic media (i.e., media that is artificially produced, manipulated, and/or modified). While such algorithms may be employed in a variety of beneficial ways—such as for text-to-image translation, facial aging, 3D object generation, and image resolution enhancement, among others—they may also be used by bad actors to mislead consumers of digital media. For example, a generative machine learning algorithm may be used to edit a video of an individual speaking to make it appear as though the individual said something that he/she did not actually say. Such "deepfakes" are becoming increasingly difficult to detect.

SUMMARY

Public facing organizations are particularly susceptible to deepfakes, due to the large quantities of original media (in the form of news releases and promotional materials, among others) that they typically provide to the public. While the release of such original media may be helpful in informing the public about organizational operations and opportunities, it may also provide bad actors with a wealth of training data that may be used to train generative machine learning algorithms that are designed to create deepfakes. Such deepfakes may then be used to spread disinformation about the organization. In particular, consumers of the digital media released by the organization may be unable to distinguish deepfakes generated by bad actors from the real media released by the organization.

This disclosure contemplates a video registration and authentication system designed to help protect an organization against the threat of deepfakes. The system includes a registration server that enables the organization to register videos in a blockchain, thereby storing a record of the videos in an essentially tamper-proof form. Each time the organization generates original videos, it may use the registration server to register the videos in the blockchain, before releasing the videos to the public. After the organization releases a video to the public, consumers of the video may submit a copy of it to an authentication server, which compares the submitted video to the version stored in the blockchain. If the submitted video matches the version stored in the blockchain, the authentication server notifies the consumer who submitted the video that the video is authentic. On the other hand, if the submitted video does not match the version stored in the blockchain, the authentication server may notify the consumer that the video is not authentic and/or provide the consumer with a new copy of the video in which the portions of the video that have been modified as compared to the original are identified. Certain embodiments of the tool are described below.

According to one embodiment, a video authentication system comprising a registration server and an authentication server. The registration server is configured to register a source video in a blockchain ledger. The authentication server is configured to authenticate a target video by comparing the target video to the source video. The registration server includes a first memory and a first hardware processor communicatively coupled to the first memory. The first memory stores a hash function and a blockchain ledger. The hash function is configured to generate a hash value based on a set of pixels. The blockchain ledger includes a plurality of blockchain transactions. The first hardware processor receives the source video. The source video includes a first plurality of frames and a first set of metadata. Each frame of the first plurality of frames includes a plurality of pixels. The first processor also splits the source video into a series of source video segments. The series of source video segments includes a first source video segment. The first source video segment includes a first set of sequential frames of the first plurality of frames. The first set of sequential frames of the first plurality of frames begins at a starting timestamp, lasts a set time interval, and includes a first set of pixels. The first processor additionally generates a first hash value based on the first video segment. The first hash value is generated by applying the hash function to the first set of pixels. The first processor further generates a first blockchain transaction that includes the first hash value. The first processor also stores the first blockchain transaction as a first block in the blockchain ledger. The first processor additionally obtains an identifier for the first block in the blockchain ledger. The first processor further stores the identifier in the first set of metadata. The authentication server includes a second memory and a second hardware processor communicatively coupled to the second memory. The second memory stores the hash function. The second processor receives, from a user device, a request to authenticate a first target video. The first target video includes a second plurality of frames and a second set of metadata. Each frame of the second plurality of frames includes a plurality of pixels. The second processor also splits the first target video into a series of target video segments. The series of target video segments includes a first target video segment. The first target video segment includes a first set of sequential frames of the second plurality of frames. The first set of sequential frames of the second plurality of frames begins at the starting timestamp, lasts the set time interval, and includes a second set of pixels. The second processor additionally generates a second hash value based on the first target video segment. The second hash value is generated by applying the hash function to the second set of pixels. The second processor further determines that the second set of metadata includes the identifier. The second processor also uses the identifier to locate the first blockchain transaction in the blockchain ledger. The second processor additionally determines that the second hash value does not match the first hash value stored in the first blockchain transaction. In response to determining that the second hash value does not match the first hash value stored in the first blockchain transaction, the second processor transmits an alert to the user device indicating that the first target video is not authentic.

According to another embodiment, a method includes receiving a source video. The source video includes a first plurality of frames and a first set of metadata. Each frame of the first plurality of frames includes a plurality of pixels. In response to receiving the source video, the method includes splitting the source video into a series of source video segments. The series of source video segments includes a first source video segment. The first source video segment includes a first set of sequential frames of the first plurality of frames. The first set of sequential frames of the first plurality of frames begins at a starting timestamp, lasts a set time interval, and includes a first set of pixels. The method also includes generating a first hash value based on the first video segment. The first hash value is generated by applying a hash function to the first set of pixels. The method additionally includes generating a first blockchain transaction that includes the first hash value. The method further includes storing the first blockchain transaction as a first block in a blockchain ledger. The method also includes obtaining an identifier for the first block in the blockchain ledger. The method additionally includes storing the identifier in the first set of metadata. The method further includes receiving, from a user device, a request to authenticate a first target video. The first target video includes a second plurality of frames and a second set of metadata. Each frame of the second plurality of frames includes a plurality of pixels. In response to receiving the request to authenticate the first target video, the method includes splitting the first target video into a series of target video segments. The series of target video segments includes a first target video segment. The first target video segment includes a first set of sequential frames of the second plurality of frames. The first set of sequential frames of the second plurality of frames begins at the starting timestamp, lasts the set time interval, and includes a second set of pixels. The method also includes generating a second hash value based on the first target video segment. The second hash value is generated by applying the hash function to the second set of pixels. The method additionally includes determining that the second set of metadata includes the identifier. The method further includes using the identifier to locate the first blockchain transaction in the blockchain ledger. The method also includes determining that the second hash value does not match the first hash value stored in the first blockchain transaction. In response to determining that the second hash value does not match the first hash value stored in the first blockchain transaction, the method includes transmitting an alert to the user device indicating that the first target video is not authentic.

According to a further embodiment, a system includes a first non-transitory computer-readable medium and a second non-transitory computer-readable medium. The first non-transitory computer-readable medium includes first instructions that are configured, when executed by a first hardware processor, to receive a source video. The source video includes a first plurality of frames and a first set of metadata. Each frame of the first plurality of frames includes a plurality of pixels. The first instructions are also configured, when executed by the first processor, to split the source video into a series of source video segments. The series of source video segments includes a first source video segment. The first source video segment includes a first set of sequential frames of the first plurality of frames. The first set of sequential frames of the first plurality of frames begins at a starting timestamp, lasts a set time interval, and includes a first set of pixels. The first instructions are additionally configured, when executed by the first processor, to generate a first hash value based on the first video segment. The first hash value is generated by applying a hash function to the first set of pixels. The first instructions are further configured, when executed by the first processor, to generate a first blockchain transaction that includes the first hash value. The first instructions are also configured, when executed by the first processor, to store the first blockchain transaction as a first block in a blockchain ledger. The first instructions are additionally configured, when executed by the first processor, to obtain an identifier for the first block in the blockchain ledger and to store the identifier in the first set of metadata. The second non-transitory computer-readable medium includes second instructions that are configured, when executed by a second hardware processor, to receive, from a user device, a request to authenticate a first target video. The first target video includes a second plurality of frames and a second set of metadata. Each frame of the second plurality of frames includes a plurality of pixels. The second instructions are also configured, when executed by the second processor, to split the first target video into a series of target video segments. The series of target video segments includes a first target video segment. The first target video segment includes a first set of sequential frames of the second plurality of frames. The first set of sequential frames of the second plurality of frames begins at the starting timestamp, lasts the set time interval, and includes a second set of pixels. The second instructions are additionally configured, when executed by the second processor, to generate a second hash value based on the first target video segment. The second hash value is generated by applying the hash function to the second set of pixels. The second instructions are further configured, when executed by the second processor, to determine that the second set of metadata includes the identifier. The second instructions are also configured, when executed by the second processor, to use the identifier to locate the first blockchain transaction in the blockchain ledger. The second instructions are additionally configured, when executed by the second processor, to determine that the second hash value does not match the first hash value stored in the first blockchain transaction. In response to determining that the second hash value does not match the first hash value stored in the first blockchain transaction, the second instructions are configured, when executed by the second processor, to transmit an alert to the user device indicating that the first target video is not authentic.

Certain embodiments provide one or more technical advantages. As an example, an embodiment improves the security of an organization's media, by enabling the organization to register its videos in a blockchain stored on a distributed blockchain network. As a result, a bad actor seeking to modify the organization's record of a video would need to compromise a majority of the devices of the distributed network, instead of having to breach only one device (e.g., if there were a centralized database storing the original video). However, being able to compromise enough devices to falsify records on the block chain is extremely difficult, especially because a bad actor would need to breach each of the devices simultaneously. Therefore, using a blockchain to store a record of an original video provides increased information security for the original video. As another example, an embodiment reduces the processing resources used in detecting videos that are not authentic, by comparing hash values generated from both the original video and the target video under consideration, rather than comparing individual video frames and/or pixels. The system described in this disclosure may particularly be integrated into a practical application of a video authentication tool for use by an organization seeking to protect itself from the threat of deepfakes. The organization may use the registration server to register videos in a blockchain, thereby storing an essentially tamper-proof record of the content of the videos. After the organization releases the videos to the public, members of the public who view purported copies of the videos may submit such copies to the authentication server to determine their authenticity. The authentication server may then use the information stored in the blockchain to determine whether or not the purported copies are authentic.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 6 of the drawings, like numerals being used for like and corresponding parts of the various drawings.

I. System Overview

Figure 1:
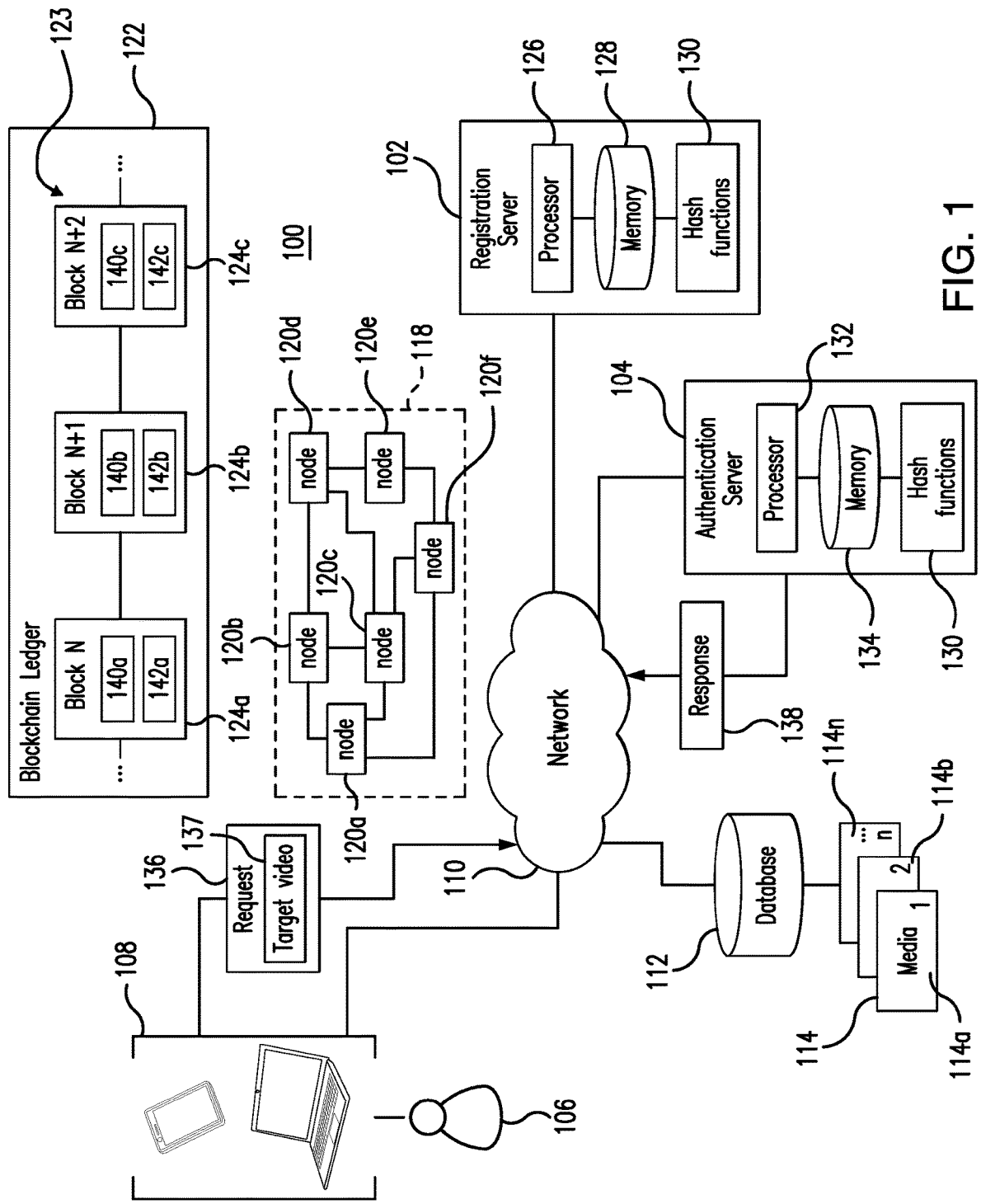
FIG. 1 illustrates an example video registration and authentication system.

FIG. 1 illustrates an example system 100 that includes registration server 102, authentication server 104, user(s) 106, device(s) 108, network 110, database 112, blockchain network 118, and blockchain ledger 122. Generally, system 100 uses registration server 102 to register source videos 114 in blockchain ledger 122. In particular, registration server 102 generates one or more hash values from a source video 114 and stores the hash values in blocks 124 of blockchain 123. The manner by which registration server 102 performs such tasks will be described in further detail below, in the discussion of FIGS. 2 and 3. In response to receiving a request 136 to authenticate a target video 137, system 100 uses authentication server 104 to compare target video 137 to source video 114. In particular, authentication server 104 generates one or more hash values from target video 137, in the same manner as registration server 102 generated hash values from source video 114. Authentication server 104 then compares each hash value generated from target video 137 to the corresponding hash value generated from source video 114 and stored in blockchain 123. If any of the hash values do not match, authentication server 104 generates an alert 138, indicating that target video 137 is not authentic. The manner by which authentication server 104 performs such tasks will be described in further detail below, in the discussion of FIGS. 4 through 6.

Devices 108 are used by users 106 to send requests 136 to registration server 102 and/or authentication server 104. As an example, in certain embodiments, devices 108 may be used by users 106 to send requests 136 to registration server 102, seeking to register a given source video 114 in blockchain ledger 122. For example, users 106 may be members of an organization seeking to protect source video 114 from deepfakes generated by bad actors based on source video 114. As another example, in certain embodiments, devices 108 may be used by users 106 to send requests 136 to authentication server 104, seeking to authenticate target video 137. For example, users 106 may be members of the public seeking to authenticate a target video 137 purportedly generated by the organization to which authentication server 104 belongs. In such embodiments, request 136 may include a copy of the target video 137. In some embodiments, request 136 may include a link to a copy of target video 137. Devices 108 are also used by users 106 to receive responses 138 from authentication server 104. As an example, devices 108 may be used by users 106 to receive responses 138 from authentication server 104 indicating that a target video 137, submitted to authentication server 104 by user 106, is either authentic or not authentic. As another example, in certain embodiments in which authentication server 104 determines that a target video 137 is not authentic, responses 138 may include the target video, modified to indicate the portion(s) of the video that are not authentic. The manner by which authentication server 104 may modify a target video 137 to indicate the portion(s) of the video that are not authentic is described in further detail below, in the discussion of FIGS. 5A and 5B.

Devices 108 include any appropriate device for communicating with components of system 100 over network 110. For example, devices 108 may be a telephone, a mobile phone, a computer, a laptop, a wireless or cellular telephone, a tablet, a server, and IoT device, and/or an automated assistant, among others. This disclosure contemplates devices 108 being any appropriate device for sending and receiving communications over network 110. Device 108 may also include a user interface, such as a display, a microphone, keypad, or other appropriate terminal equipment usable by user 106. In some embodiments, an application executed by a processor of device 108 may perform the functions described herein.

Network 110 facilitates communication between and amongst the various components of system 100. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 112 stores source videos 114. Source videos 114 include any videos that an organization may wish to register as authentic. As an example, source videos 114 may include any videos generated by the organization on an internal network. For example, source videos 114 may include videos generated on an internal network that have not yet been released to the public. Source videos 114 may also include any videos that relate to subjects associated with the organization to which registration server 102 and/or authentication server 104 belong. For example, source videos 114 may include videos of the organization's employees, managers, executives, and/or any other individuals associated with the organization. As another example, source videos 114 may include videos of one or more of the organization's locations. For example, source videos 114 may include video of the inside of the organization's headquarters.

Blockchain network 118 is a peer-to-peer network of nodes 120. In some embodiments, blockchain network 118 is a public blockchain network. In certain embodiments, blockchain network 118 is a private blockchain network. For example, membership in blockchain network 118 may be limited to nodes 120 registered as belonging to and/or affiliated with the organization to which registration server 102 belongs. In certain embodiments, registration server 102 and/or authentication server 104 are members of blockchain network 118 (e.g., are nodes 120 in blockchain network 118). Each node 120a through 120f of blockchain network 118 comprises a ledger 122 configured to store a copy of a blockchain 123. Blockchain 123 includes a set of blockchain transactions 140 executed in blockchain network 118. Blockchain 123 links together blocks of data 124a through 124c, which store blockchain transactions 140. The transactions 140a through 140c, stored in blocks 124a through 124c, may include information, files, and/or any other suitable type of data. For example, transactions 140a through 140c may include hash values generated by applying a hash function to portions of a video 114, as described in detail below, in the discussion of FIGS. 2A and 2B.

Each block 124 in blockchain 123 includes information derived from a preceding block 124. For example, every block 124 in blockchain 123 includes a hash 142 of the previous block 124. By including hashes 142, blockchain 123 forms a chain of blocks 124 from a genesis block 124 to the current block 124c. Each block 124 is guaranteed to come after the previous block 124 chronologically because the previous block's hash 142 would otherwise not be known. In certain embodiments, blocks 124 in blockchain 123 may be linked together by identifying a preceding block with a cryptographic checksum (e.g. secure hash algorithm (SHA)-256) of its contents (e.g. the transaction and additional metadata). Links are formed by storing the cryptographic checksum identifier 142 of one block 124 in the metadata of another block 124, such that the former block 124 becomes the predecessor of the latter block 124. In this way, blocks 124 form a chain that can be navigated from block-to-block by retrieving the cryptographic checksum 142 of a particular block's predecessor from the particular block's own metadata. Each block 124 is computationally impractical to modify once it has been added to blockchain 123 because every block 124 after it would also have to be regenerated. These features protect data stored in blockchain 123 from being modified by bad actors, thereby providing security to the information stored in the blockchain. When a network node 120 publishes an entry (e.g. one or more transactions 140 in a block 124) in its ledger 122, the blockchain 123 for all other network nodes 120 in the blockchain network 118 is also updated with the new entry. Thus, data published in block chain 123 is available and accessible to every network node 120 with a ledger 122. This allows the data stored in the blocks 124 to be accessible for inspection and verification at any time by any device with a copy of ledger 122.

As seen in FIG. 1, registration server 102 includes a processor 126 and a memory 128. This disclosure contemplates processor 126 and memory 128 being configured to perform any of the functions of registration server 102 described herein. Generally, registration server 102 receives a source video 114 and registers the source video in blockchain ledger 122. In particular, registration server 102 splits source video 114 into a series of video segments, each of which may include a set number of video frames. Registration server 102 then generates one or more hash values for each video segment, by applying a hash function 130 to the video frames (either the full frames or regions of the frames) that make up each video segment. For example, registration server 102 may apply the hash function 130 to the values of the pixels of the video frames included in the video segment. Registration server 102 then generates a blockchain transaction 140 for each video segment, which includes the hash value(s) generated from the video segment and stores each blockchain transaction 140 as a block 124 in blockchain 123. Further details of the manner by which registration server 102 registers source videos 114 in blockchain ledger 122 are presented below, in the discussion of FIGS. 2 and 3.

As seen in FIG. 1, authentication server 104 similarly includes a processor 132 and a memory 134. This disclosure contemplates processor 132 and memory 134 being configured to perform any of the functions of authentication server 104 described herein. Generally, authentication server 104 receives requests 136 to authenticate target videos 137 and determines whether or not the target videos are authentic using blockchain 123. In particular, to determine whether a target video 137 is an authentic version of a source video 114, authentication server 104 splits the target video 137 into a series of video segments, in the same manner that registration server 102 split source video 114 into the series of video segments. Authentication server 104 then generates one or more hash values for each video segment, by applying hash function 130 to the video frames that make up each video segment, in the same manner that registration server 102 applied hash function 130 to each video segment of source video 114. Authentication server 104 then compares the hash values it generates to the hash values stored in blockchain 123 for source video 114. If any of the hash values do not match, authentication server 104 sends an alert 138, indicating that target video 137 is not authentic. In certain embodiments, authentication server 104 modifies target video 137 to indicate the portion(s) of the video that are not authentic and transmits the modified target video to user 106 in response 138. On the other hand, if all of the hash values match, authentication server 104 sends response 138, indicating that target video 137 is authentic. Further details of the manner by which authentication server 104 authenticates target videos 137 using blockchain ledger 122 are presented below, in the discussion of FIGS. 4 through 6.

Processor 126 is any electronic circuitry, including, but not limited to microprocessors, application specific integrated circuits (ASIC), application specific instruction set processor (ASIP), and/or state machines, that communicatively couples to memory 128 and controls the operation of registration server 102. Similarly, processor 132 is any electronic circuitry, including, but not limited to microprocessors, application specific integrated circuits (ASIC), application specific instruction set processor (ASIP), and/or state machines, that communicatively couples to memory 134 and controls the operation of authentication server 104.

Processors 126 and 132 may be 8-bit, 16-bit, 32-bit, 64-bit or of any other suitable architecture. Processors 126 and 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 126 and 132 may include other hardware and software that operates to control and process information. Processors 126 and 132 execute software stored on memory to perform any of the functions described herein. Processor 126 controls the operation and administration of registration server 102 by processing information received from network 110, device(s) 108, database 112, blockchain network 118, and memory 128. Similarly, processor 132 controls the operation and administration of authentication server 104 by processing information received from network 110, device(s) 108, database 112, blockchain network 118, and memory 134. Processors 126 and 132 may each be a programmable logic device, a microcontroller, a microprocessor, any suitable processing device, or any suitable combination of the preceding. Processors 126 and 132 are not limited to single processing devices and may encompass multiple processing devices.

Memory 128 may store, either permanently or temporarily, data, operational software, or other information for processor 126. Similarly, memory 134 may store, either permanently or temporarily, data, operational software, or other information for processor 132. Memory 128 and 134 may include any one or a combination of volatile or non-volatile local or remote devices suitable for storing information. For example, memory 128 and 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 128, memory 134, a disk, a CD, or a flash drive. In particular embodiments, the software may include an application executable by processor 126 or processor 132 to perform one or more of the functions described herein.

In certain embodiments, memory 128 and memory 134 may also store one or more hash functions 130. Each hash function 130 may be configured to map an input of arbitrary length into an output of fixed length. For example, hash function 130 may be configured to map an input consisting of the values of the pixels forming a set of video frames into an output value. In certain embodiments, hash functions 130 may include cryptographic hash functions. For example, hash functions 130 may include the MD5 hash algorithm, the SHA-1 hash algorithm, and/or any other suitable hash function. The use of cryptographic hash functions may be desirable to help ensure that target videos 137 are identical to source videos 114. For example, a cryptographic hash value generated from a first video segment will only match a cryptographic hash value generated from a second video segment if the values of the pixels contained in both video segments are identical; if even one pixel value differs between the two video segments, the cryptographic hash values generated from the video segments will be different. In some embodiments, hash functions 130 may include one or more perceptual hash functions. For example, hash functions 130 may include an average hashing function (aHash), a perception hashing function (pHash), a difference hashing function (dHash), and/or a wavelet hashing function (wHash). The use of perceptual hash functions may be desirable to help authenticate target videos 137 that may differ slightly from source videos 114 for reasons other than modifications related to synthetic media generation. For example, the use of perceptual hash functions may be used to determine that a target video 137 is an authentic version of a source video 114 (e.g., has not been modified by synthetic media generation), even though target video 137 has been scaled as compared to source video 114, has a different aspect ratio as compared to source video 114, and/or has minor coloring differences (e.g., contract, brightness, etc.) as compared to source video 114. In embodiments in which perceptual hash functions are used, determining that a hash value generated from a source video 114 matches a hash value generated from a target video 137 may include determining that a Hamming distance calculated between the two hash values is less than a set amount.

Modifications, additions, or omissions may be made to the systems described herein without departing from the scope of the invention. For example, system 100 may include any number of users 106, devices 108, networks 110, databases 112, and blockchain networks 118. The components may be integrated or separated. Moreover, the operations may be performed by more, fewer, or other components. Additionally, the operations may be performed using any suitable logic comprising software, hardware, and/or other logic.

II. Source Video Registration

Figure 2A:
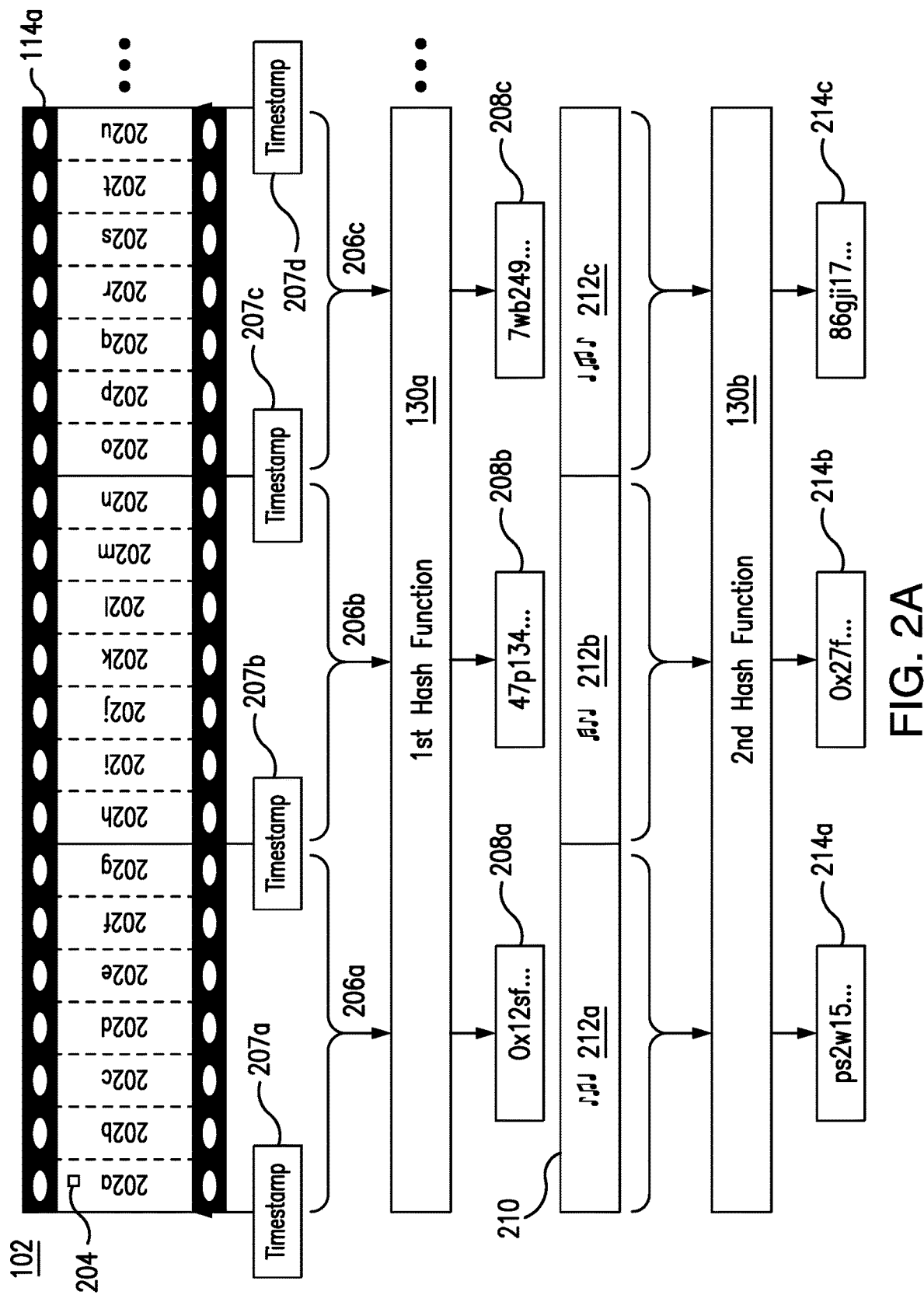
FIGS. 2A and 2B present an example of the process by which a source video is registered in a blockchain as authentic by a registration server of the video registration and authentication system of FIG. 1.
Figure 2B:
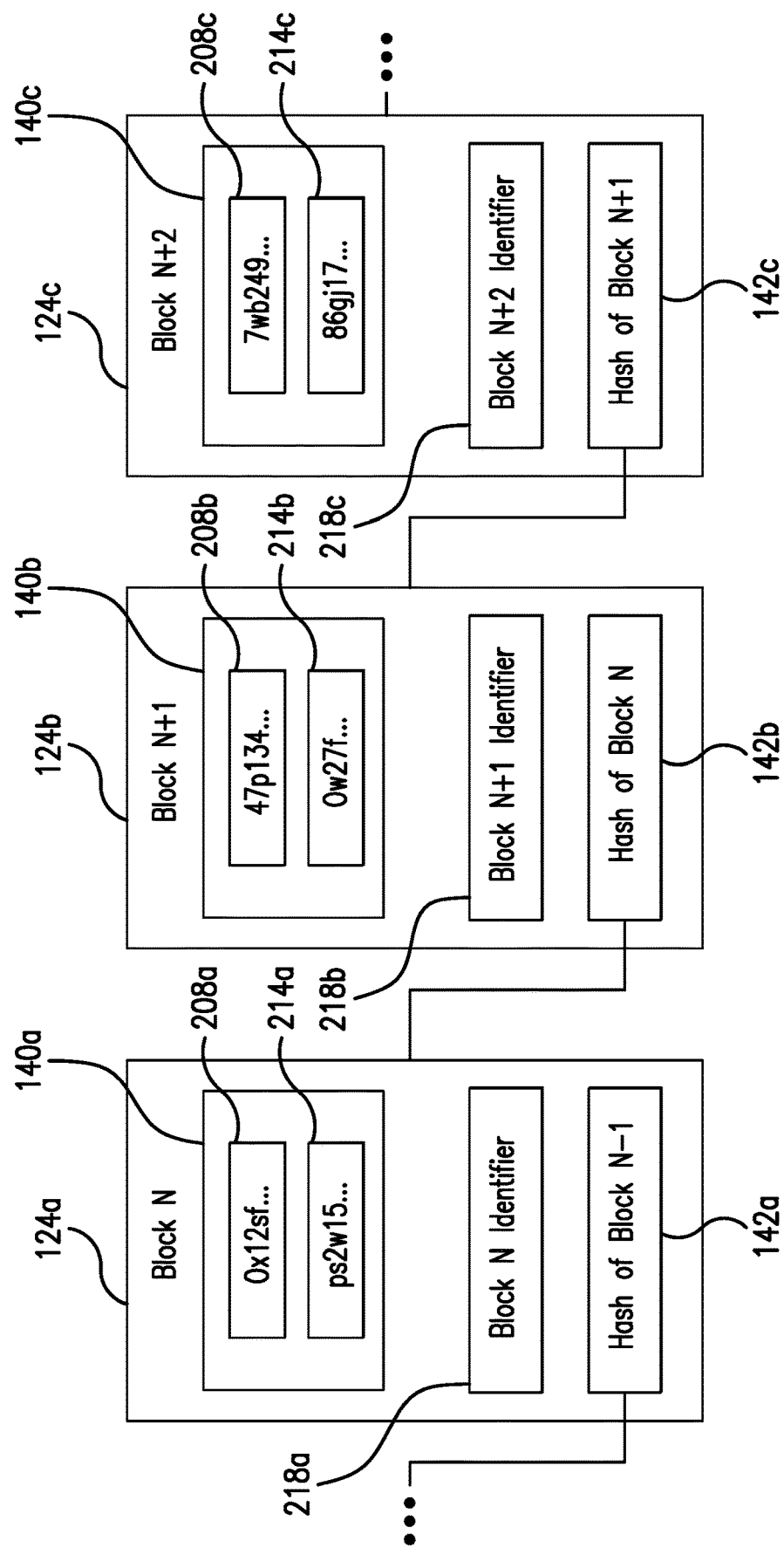

FIGS. 2A and 2B present an example of the process by which registration server 102 registers source video 114a in blockchain 123, thereby storing a record of source video 114a in blockchain 123. As illustrated in FIG. 2A, source video 114a includes a set of video frames 202. Each frame 202 includes a set of pixels 204. In response to receiving source video 114a, registration server 102 splits source video 114a into a series of video segments 206 and then uses hash function 130 to generate a hash value 208 for each video segment 206, based on the pixels 204 included in the video segment. As illustrated in FIG. 2B, registration server 102 then stores each hash value 208 as part of a transaction 216 in a block 124 of blockchain 123. In this manner, registration server 102 stores a record of each video segment 206 in blockchain 123, such that a later modification to a particular video segment of a copy of source video 114a may be detectable by generating a hash value of that video segment and comparing it to the hash value stored in blockchain 123.

Registration server 102 may split source video 114a into a series of video segments 206 in any suitable manner. As an example, in certain embodiments, and as illustrated in FIG. 2A, registration server 102 may split source video 114a into a series of video segments 206 by splitting source video 114a into one or more groups of sequential frames 202. Each group of sequential frames 202 may include a set number of sequential frames 202. For example, as illustrated in FIG. 2A, registration server 102 may split source video 114a into first video segment 206a, which includes sequential frames 202a through 202g, second video segment 206b, which includes sequential frames 202h through 202n, and third video segment 206c, which includes sequential frames 202o through 202u. Where source video 114a includes a total number of frames 202 not evenly divisible by the set number of frames to be included in each video segment 206, the last video segment 206 generated from source video 114a may include the remaining frames 202. As illustrated in FIG. 2A, each video segment 206 begins at a starting timestamp 207 and lasts a set time interval, dictated by the number of video frames 202 included in the video segment. For example, first video segment 206a begins at starting timestamp 207a and lasts for the time interval between starting timestamp 207a and ending timestamp 207b. Similarly, second video segment 206b begins at starting timestamp 207b and lasts for the time interval between starting timestamp 207b and ending timestamp 207c, and third video segment 206c begins at starting timestamp 207c and lasts for the time interval between starting timestamp 207c and ending timestamp 207d.

As another example, in certain embodiments, registration server 102 may split source video 114a into a series of video segments 206, where each video segment 206 includes a portion of a set of sequential frames 202. For example, registration server 102 may split each frame 202 of source video 114a into a set of regions and group the same region from each of a set of sequential frames into a video segment 206. For instance, registration server 102 may split each frame 202a through 202g into a 3×3 grid of regions, and group the upper right-hand corner regions of frames 202a through 202g into a first video segment 206, the upper left-hand corner regions of frame 202a through 202g into a second video segment 206, etc., repeating the process for sequential frames 202h through 202n, as well as sequential frames 202o through 202u. Similarly, as another option, registration server 102 may split each frame 202a through 202g into a lower region, a middle region, and an upper region, and group the lower regions of frames 202a through 202g into a first video segment 206, the middle regions of frames 202a through 202g into a second video segment 206, and the upper regions of frames 202a through 202g into a third video segment 206, repeating the process for sequential frames 202h through 202n, as well as sequential frames 202o through 202u. Forming video segments 206 that include regions of sequential video frames 202 (rather than the full video frames) may be desirable when comparing a target video 137 to source video 114a, where target video 137 includes a modification as compared to source video 114a, to help pinpoint the location of the modification in target video 137, as described in further detail below, in the discussion of FIG. 5B.

After splitting source video 114a into a set of video segments 206, registration server 102 obtains a hash value 208 for each segment by applying a hash function 130a to the set of pixels included in the segment. For example, registration server 102 obtains hash value 208a for first video segment 206a by applying hash function 130a to the values of the pixels included in first video segment 206a, hash value 208b for second video segment 206b by applying hash function 130a to the values of the pixels included in second video segment 206b, and hash value 208c for third video segment 206c by applying hash function 130a to the values of the pixels included in third video segment 206c. As described above, hash function 130a may be a cryptographic hash function or a perceptual hash function.

In addition to generating hash values from video segments 206, in certain embodiments, registration server 102 generates hash values based on the audio 210 of source video 114a. For example, registration server 102 may split audio 210 into a set of audio segments 212, where each audio segment 212 corresponds to a given video segment 206. For example, first audio segment 212a may include the audio of source video 114a between starting timestamp 207a and ending timestamp 207b, thereby corresponding to first video segment 206a, which includes video frames 202a through 202g. Similarly, second audio segment 212b may include the audio of source video 114a between starting timestamp 207b and ending timestamp 207c, thereby corresponding to second video segment 206b, which includes video frames 202h through 202n, and third audio segment 212c may include the audio of source video 114a between starting timestamp 207c and ending timestamp 207d, thereby corresponding to third video segment 206c, which includes video frames 202o through 202u.

After splitting audio 210 into a set of audio segments 212, registration server 102 obtains a hash value 214 for each segment by applying a hash function 130b to the set of audio signals included in the segment. For example, registration server 102 obtains hash value 214a for first audio segment 212a by applying hash function 130b to the values of the audio signals included in first audio segment 212a, hash value 214b for second video segment 212b by applying hash function 130b to the values of the audio signals included in second audio segment 212b, and hash value 214c for third audio segment 212c by applying hash function 130b to the values of the audio signals included in third audio segment 212c. Hash function 130b may be the same hash function as hash function 130a or a different hash function from hash function 130a.

After generating hash values 208 and/or 214, registration server 102 stores the hash values in blockchain 123. FIG. 2B presents an example blockchain 123. As illustrated in FIG. 2B, in certain embodiments, for each video segment 206 and/or audio segment 212, registration server 102 generates a blockchain transaction 140 that includes the hash value 208 generated from the video segment 206 and/or the hash value 214 generated from the audio segment 212. Registration server 102 then stores the blockchain transaction 140 as a block 124 in blockchain 123. For example, as illustrated in FIG. 2B, registration server 102 may store hash value 208a, generated from first video segment 206a, and/or hash value 214a, generated from first audio segment 212a, as first blockchain transaction 140a in block 124a. Similarly, registration server 102 may store hash value 208b, generated from second video segment 206b, and/or hash value 214b, generated from first audio segment 212b, as second blockchain transaction 140b in block 124b. Registration server 102 may also store hash value 208c, generated from third video segment 206c, and/or hash value 214c, generated from first audio segment 212c, as third blockchain transaction 140c in block 124c. In some embodiments, registration server 102 may store the hash values 208 and/or 214 for all video segments 206 and/or audio segments 212 as a single transaction 140, in a single block 124 of blockchain 123.

In certain embodiments, in addition to storing hash value 208, generated from video segment 206, as blockchain transaction 140 in block 124, registration server 102 may also store hash values generated from each frame 202 of the video segment 206 in blockchain transaction 140. For example, in addition to storing hash value 208a, generated from video segment 206a, as blockchain transaction 140a, registration server 102 may also store hash values generated from each of video frames 202a through 202g that form video segment 206a in blockchain transaction 140a. Similarly, in addition to storing hash value 208b, generated from video segment 206b, as blockchain transaction 140b, registration server 102 may also store hash values generated from each of video frames 202h through 202n that form video segment 206b in blockchain transaction 140b, and in addition to storing hash value 208c, generated from video segment 206c, as blockchain transaction 140c, registration server 102 may also store hash values generated from each of video frames 202o through 202u that form video segment 206c in blockchain transaction 140c. Storing the hash values generated from each video frame 202 that forms video segment 206 in blockchain transaction 140, in addition to the hash value generated from video segment 206, may be desirable to enable an efficient comparison between a target video 137 and source video 114a. For example, when a set of sequential video frames of target video 137 is identical to a corresponding set of sequential video frames of source video 114a, a comparison of the hash values generated from the set of full sequential video frames will indicate that the frames are identical, and no further comparison between the hash values generated from the individual video frames 202 is needed. On the other hand, when a set of sequential video frames of target video 137 has been modified as compared to the corresponding set of sequential video frames of source video 114a, a comparison of the hash values generated from the set of full sequential video frames will indicate that the frames are not identical. Then, a comparison of the hash values generated from the individual video frames 202 will indicate the frames of target video 137 that have been modified in comparison to source video 114a. Storing the hash values generated from each video frame 202 that forms video segment 206 in blockchain transaction 140, in addition to the hash value generated from video segment 206, may also be desirable where a target video 137 differs from source video 114a as a result of one or more video frames being added to/removed from target video 137. For example, consider a situation in which target video 137 is identical to source video 114a except that target video 137 does not include first frame 202a of source video 114a. Because of this difference, none of the video segments 206 generated from source video 114a will match any of the video segments generated from target video 137; the video segments generated from target video 137 will be off by one frame 202 from the video segments 206 generated from source video 114a. However, a comparison of the hash values generated from the individual video frames 202 forming both source video 114a and target video 137 will indicate that source video 114a and target video 137 are identical except for the missing frame in target video 137.

In certain embodiments in which registration server 102 splits each frame 202 of source video 114a into a set of regions, registration server 102 may store the set of hash values generated from a given set of sequential frames 202 in the same blockchain transaction 140. For example, where registration server 102 splits each frame of the set of sequential frames into a 3×3 grid, registration server 102 may store the 9 hash values generated from the set of sequential frames in blockchain transaction 140. In some embodiments, registration server 102 may additionally store a hash value generated from the full set of sequential frames 202 in the same blockchain transaction 140 as the set of hash values generated from the individual regions of the sequential frames 202. Storing both the hash values generated from a set of regions of sequential video frames 202 as well as the hash value generated from the set of full sequential video frames 202 may enable an efficient comparison between a target video 137 and source video 114a. For example, when a set of sequential video frames of target video 137 is identical to a corresponding set of sequential video frames of source video 114a, a comparison of the hash values generated from the set of full sequential video frames will indicate that the frames are identical, and no further comparison between the hash values generated from the sets of regions of the sequential video frames is needed. On the other hand, when a set of sequential video frames of target video 137 has been modified as compared to the corresponding set of sequential video frames of source video 114a, a comparison of the hash values generated from the set of full sequential video frames will indicate that the frames are not identical. Then, a comparison of the hash values generated from the different regions of the set of sequential frames may pinpoint the location of the modification in target video 137.

In certain embodiments, registration server 102 may store additional information in blockchain transactions 140. As an example, in certain embodiments, registration server 102 may store a record of the number of video frames 202 included in the video segment 206 used to generate hash 208, stored in blockchain transaction 140.

In addition to storing blockchain transaction 216, each block 124 of blockchain 123 stores an identifier 218 and a hash 142 of the previous block 124 in blockchain 123. As described above, storing hash 142a in block 124a helps to protect block 124a from modification by a bad actor, because any modification to block 124a would require additional modifications of all of the blocks 124b through 124c following block 124a in blockchain 123. For example, a modification of block 124a will lead to a different hash value for block 124a. Accordingly, hash 142b, stored in block 124b, will also have to be modified. However, such a modification will lead to a different hash value for block 124b, such that hash 142c, stored in block 124c, will also have to be modified, etc.

Identifier 218 provides the location of block 124 within blockchain 123. In certain embodiments, registration server 102 may store identifier 218a, corresponding to the first block 124a within blockchain 123 that stores information related to source video 114a, in the metadata of source video 114a. The presence of identifier 218a within the metadata of source video 114a may help protect the organization that generated source video 114a from the generation of deepfakes in multiple ways. First, if the organization includes an identifier 218 in the metadata of each source video 114 that it generates, then a target video 137 purporting to be associated with the organization, may easily be identified as not authentic, if it does not include an identifier 218. Secondly, if a target video 137, purporting to be associated with the organization, does include an identifier 218, the identifier 218 may be used to easily locate the record of the corresponding source video 114 in blockchain 123 so that a comparison between target video 137 and source video 114 may be made. The process by which such a comparison is made is described in further detail below, in the discussion of FIGS. 4 through 6.

Figure 3:
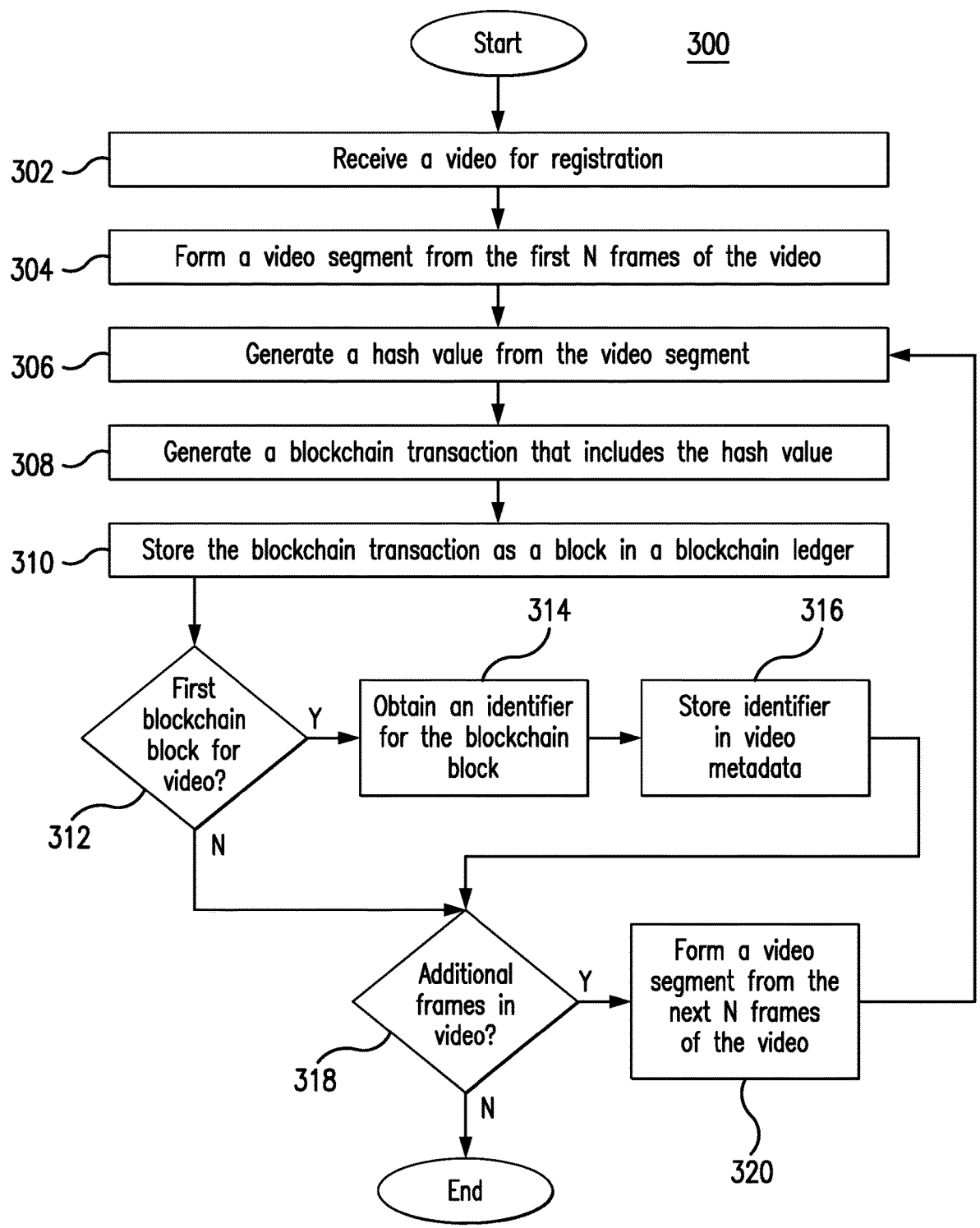
FIG. 3 presents a flowchart illustrating the process by which the registration server of the video registration and authentication system of FIG. 1 registers a source video with a blockchain.

FIG. 3 presents a flowchart illustrating the process by which registration server 102 registers a source video 114 with blockchain 123. In step 302 registration server 102 receives a source video 114 for registration. In step 304 registration server 102 forms a video segment 206 from the first N frames 202 of source video 114. N may be any number greater than or equal to one. In step 306, registration server 102 generates one or more hash values 208 and/or 214 from video segment 206. As an example, in certain embodiments, registration server 102 may generate a hash value 208 from the values of the set of pixels included in video segment 206. In some embodiments, registration server 102 may generate a hash value 214 from the values of the audio signals included in an audio segment 212 associated with video segment 206.

In step 308 registration server 102 generates a blockchain transaction 140 that includes the one or more hash values 208 and/or 214. In step 310 registration server 102 stores the blockchain transaction 140 as a block 124 in blockchain 123 of blockchain ledger 122. In step 312 registration server determines whether the block 124 is the first block in blockchain 123 that includes information related to source video 114. If, in step 312 registration server 102 determines that block 124 is the first block in blockchain 123 that includes information related to source video 114, in step 314 registration server 102 obtains an identifier 218a for block 124 and in step 316 registration server 102 stores identifier 218a in the metadata of source video 114. Registration server 102 then proceeds to step 318. If, in step 312 registration server 102 determines that block 124 is not the first block in blockchain 123 that includes information related to source video 114, registration server 102 proceeds to step 318.

In step 318 registration server 102 determines whether there are any additional frames 202 in source video 114. If, in step 318 registration server 102 determines that there are additional frames 202 in source video 114, in step 320 registration server 102 forms a video segment 206 from the next N frames 202 of source video 114. If the number of additional frames 202 in source video 114 is less than N, registration server 102 forms video segment 206 from the remaining frames 202 of source video 114. Registration server 102 then returns to step 306 and repeats the process of steps 306 through 318.

Modifications, additions, or omissions may be made to method 300 depicted in FIG. 3. Method 300 may include more, fewer, or other steps. For example, steps may be performed in parallel or in any suitable order. While discussed as registration server 102 (or components thereof) performing the steps, any suitable component of system 100, such as device(s) 108, or nodes 120, for example, may perform one or more steps of the method.

III. Target Video Authentication

Figure 4A:
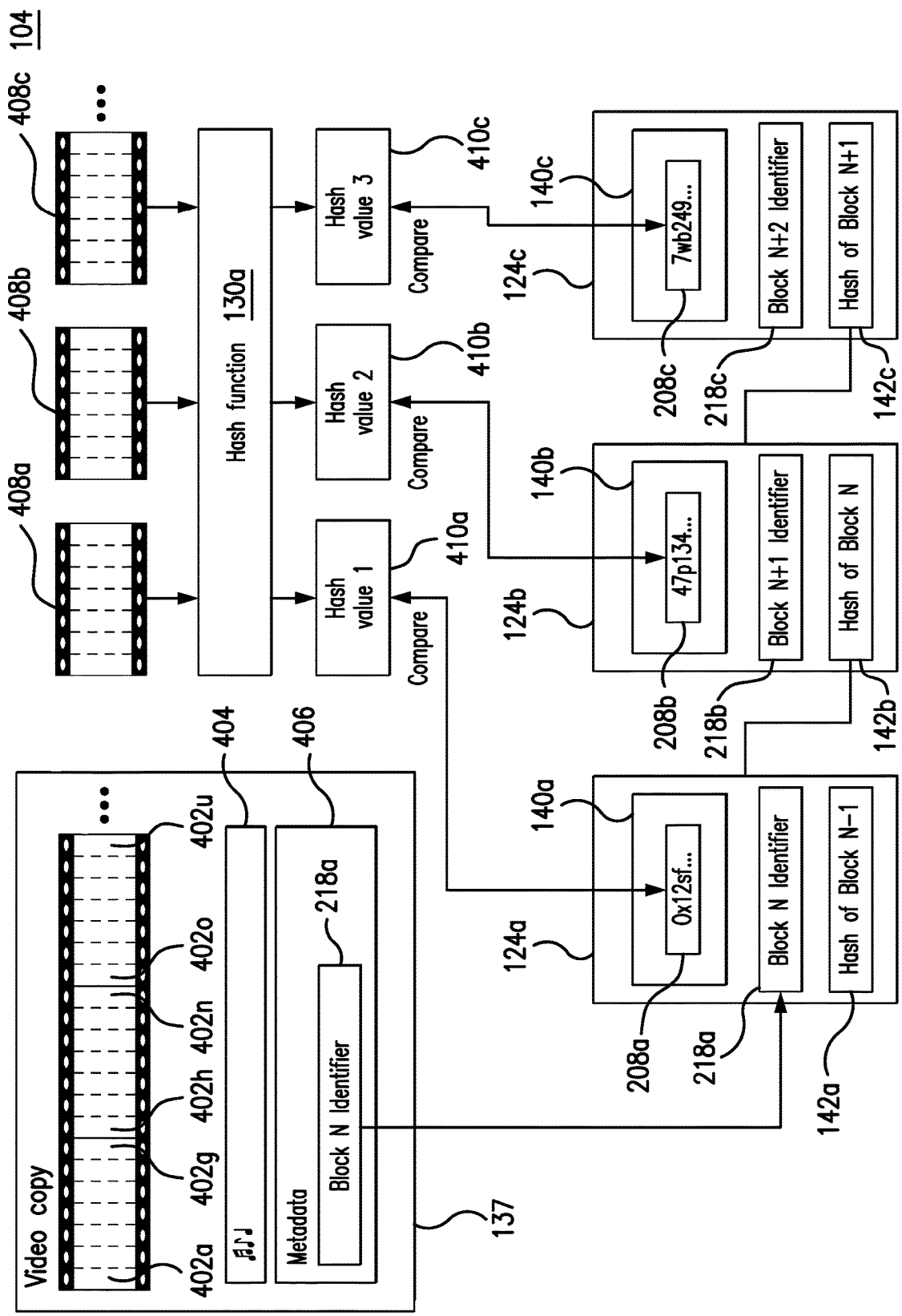
FIGS. 4A and 4B present an example of the process by which a target video is authenticated by an authentication server of the video registration and authentication system of FIG. 1.
Figure 4B:
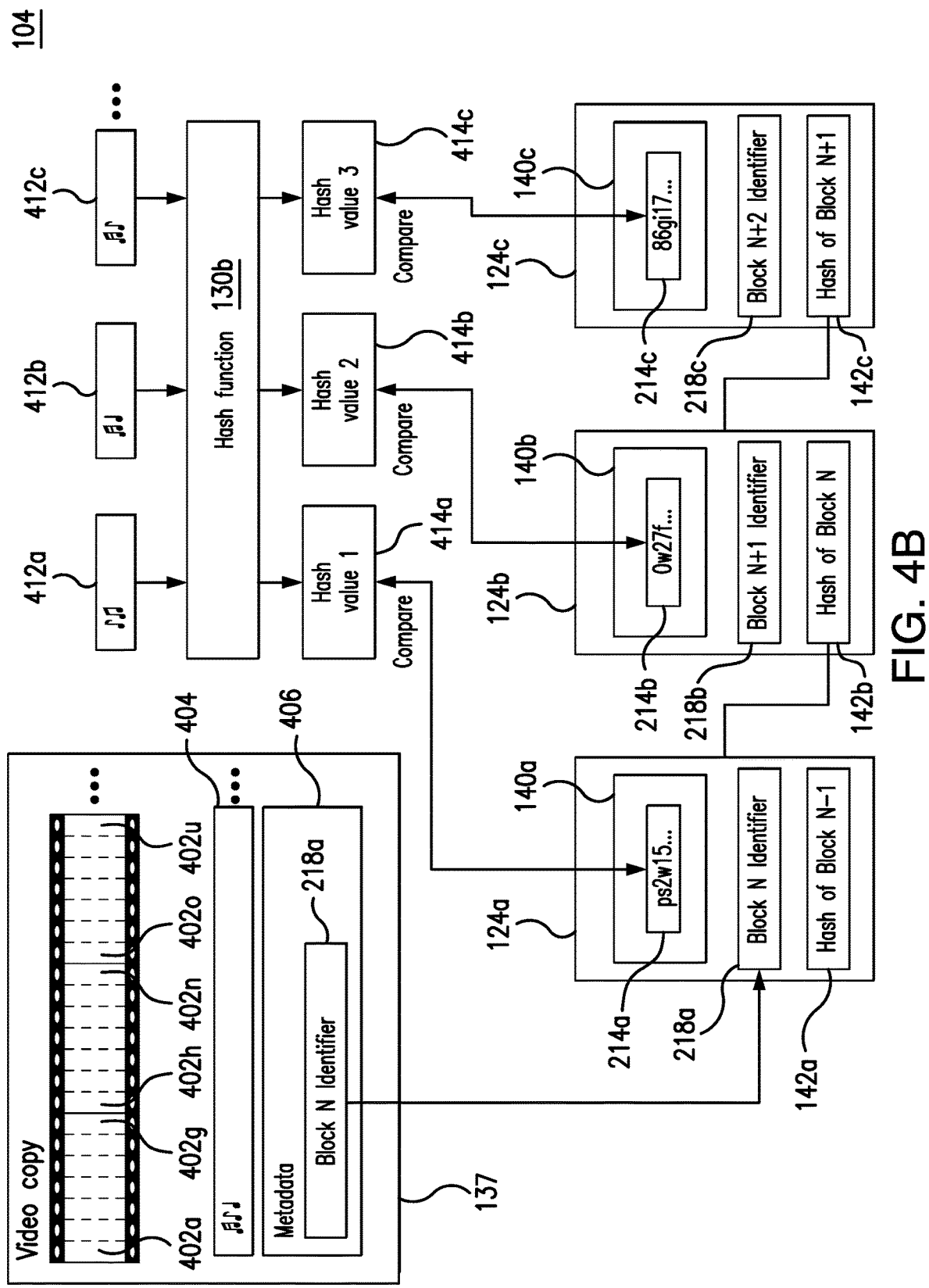

FIGS. 4A and 4B present an example of the process by which authentication server 104 authenticates a target video 137 using blockchain 123. Authentication server 104 may be operated by an organization that generates source videos 114 and releases them to the public. Authentication server 104 may receive requests 136 from members of the public seeking to determine the authenticity of target videos 137 purporting to have been produced by the organization. In response to receiving a request 136 to authenticate a target video 137, authentication server 104 is configured to determine whether or not target video 137 is associated with a source video 114, for which a record has been stored in blockchain 123, and, if so, to determine whether target video 137 has been modified as compared to source video 114.

As illustrated in FIGS. 4A and 4B, target video includes a set of video frames 402 and a set of metadata 406. Each frame 402 includes a set of pixels. In certain embodiments, in response to receiving a target video 137 from user 106 for authentication, authentication server 104 determines whether metadata 406 includes an identifier 218a corresponding to a block 124a in blockchain 123. If metadata 406 does not include identifier 218a, authentication server 104 may transmit a message 138 to user 106 indicating that target video 137 is not authentic. If metadata 406 includes identifier 218a, authentication server 104 may use it to locate block 124a within blockchain 123, where block 124a is the first block 124 within blockchain 123 that stores information relating to source video 114a.

In order to authenticate target video 137 as an authentic copy of source video 114a, authentication server 104 splits target video 137 into a set of video segments 408 in the same manner that registration server 102 split source video 114a into a set of video segments 206. For example, in certain embodiments, authentication server 104 may split target video 137 into a series of video segments 408 by splitting target video 137 into one or more groups of sequential frames 402, where each video segment 408 includes the same number of sequential frames as the corresponding video segment 206 of source video 114a, such that each video segment 408 begins at the same starting timestamp 207 and lasts the same set time interval as the corresponding video segment 206 of source video 114a. As another example, in certain embodiments, authentication server 104 may split target video 137 into a series of video segments 408, where each video segment 408 includes a portion of a set of sequential frames 402, where the portion and the set of sequential frames 402 are chosen to correspond to the portion and the set of sequential frames 202 chosen for each video segment 206 of source video 114a. For example, authentication server 104 may split each frame 402 of target video 137 into a set of regions, in the same manner that registration server 102 split each frame 202 of source video 114a into the set of regions, and group the same region from each of a set of sequential frames 402 into a video segment 408. For instance, authentication server 104 may split each frame 402a through 402g into a 3×3 grid of regions, and group the upper right-hand corner regions of frames 402a through 402g into a first video segment 408, corresponding to the first video segment 206 of source video 114a, the upper left-hand corner regions of frame 402a through 402g into a second video segment 408, corresponding to the second video segment 206 of source video 114a, etc., repeating the process for sequential frames 402h through 402n, as well as sequential frames 402o through 402u. Similarly, as another option, authentication server 104 may split each frame 402a through 402g into a lower region, a middle region, and an upper region, and group the lower regions of frames 402a through 402g into a first video segment 408, corresponding to the first video segment 206 of source video 114a, the middle regions of frames 402a through 402g into a second video segment 408, corresponding to the second video segment 206 of source video 114a, and the upper regions of frames 402a through 402g into a third video segment 408, corresponding to the third video segment 206 of source video 114a, repeating the process for sequential frames 402h through 402n, as well as sequential frames 402o through 402u.

After splitting target video 137 into a set of video segments 408, authentication server 104 obtains a hash value 410 for each segment by applying hash function 130a to the set of pixels included in the segment, where hash function 130a is the same hash function used by registration server 102 to generate hash values 208. For example, authentication server 104 obtains hash value 410a for first video segment 408a by applying hash function 130a to the values of the pixels included in first video segment 408a, hash value 410b for second video segment 408b by applying hash function 130a to the values of the pixels included in second video segment 408b, and hash value 410c for third video segment 408c by applying hash function 130a to the values of the pixels included in third video segment 408c. Authentication server 104 then compares hash values 410 to hash values 208, stored in blockchain 123. For example, authentication server 104 (1) compares hash value 410a to hash value 208a, stored in block 124a of blockchain 123, (2) compares hash value 410b to hash value 208b, stored in block 124b of blockchain 123, and (3) compares hash value 410c to hash value 208c, stored in block 124c of blockchain 123. If all of the hash values match, authentication server 104 may determine that target video 137 is an authentic copy of source video 114a, and transmit a response 138 to user 106 indicating that target video 137 is authentic. On the other hand, if any of the hash values do not match, authentication server 104 may determine that target video 137 has been modified as compared to source video 114a, such that target video 137 is not an authentic copy of source video 114a. In response to determining that target video 137 is not authentic, authentication server 104 may transmit an alert 138 to user 106 indicating that target video 137 is not authentic. In certain embodiments, in response to determining that target video 137 is not authentic, authentication server 104 may transmit a copy of target video 137, modified to indicate the portions that are not authentic, to user 106, as described in further detail below, in the discussion of FIGS. 5A and 5B.

In certain embodiments in which registration server 102 stores hash values generated from each frame 202 of video segment 206 in blockchain transaction 140, in addition to storing hash value 208, generated from video segment 206, authentication server 104 may be configured to perform additional comparisons. For example, in response to determining that hash value 410 does not match hash value 208, authentication server 104 may be configured to generate hash values for each frame 402 of video segment 408 and compare these values to the hash values generated for each frame 202 of video segment 206. In this manner, authentication server 104 may identify modifications to target video 137, as compared to source video 114a, that include the addition and/or removal of frames 402. For example, authentication server 104 may determine that target video 137 is a cropped version of source video 114a, such that the frames 402 included in target video 137 are identical to frames 202 of source video 114a. Accordingly, in certain embodiments, authentication server 104 may be configured to transmit a message 138 to user 106 indicating that target video 137 is a cropped version of source video 114a. In certain such embodiments, authentication server 104 may be configured to transmit a copy of the full source video 114a to user 106.

In certain embodiments in which registration server 102 is configured to generate hash values 214 from audio segments 212, authentication server 104 is also configured to generate hash values 414 based on the audio 404 of target video 137, in the same manner that registration server 102 generates hash values 214 from audio segments 212. For example, as illustrated in FIG. 4B, authentication server 104 may split the audio 404 of target video 137 into a set of audio segments 412, in the same manner that registration server 102 splits audio 210 of source video 114a into audio segments 212. Authentication server 104 may then generate hash values 414 from the audio segments by applying hash function 130b to the values of the audio signals included in each audio segment 412. Authentication server 104 may then compare these hash values 414 to hash values 214 stored in blockchain 123. If all of the hash values match, authentication server 104 may determine that the audio of target video 137 is an authentic copy of the audio of source video 114a, and transmit a response 138 to user 106 indicating that the audio of target video 137 is authentic. On the other hand, if any of the hash values do not match, authentication server 104 may determine that the audio of target video 137 has been modified as compared to the audio of source video 114a, such that target video 137 is not an authentic copy of source video 114a. In response to determining that target video 137 is not authentic, authentication server 104 may transmit an alert 138 to user 106 indicating that target video 137 is not authentic. In certain embodiments, in response to determining that the audio of target video 137 is not authentic, authentication server 104 may transmit a copy of target video 137 to user 106, modified to indicate the portions of target video 137 in which the audio is not authentic.

Figure 5A:
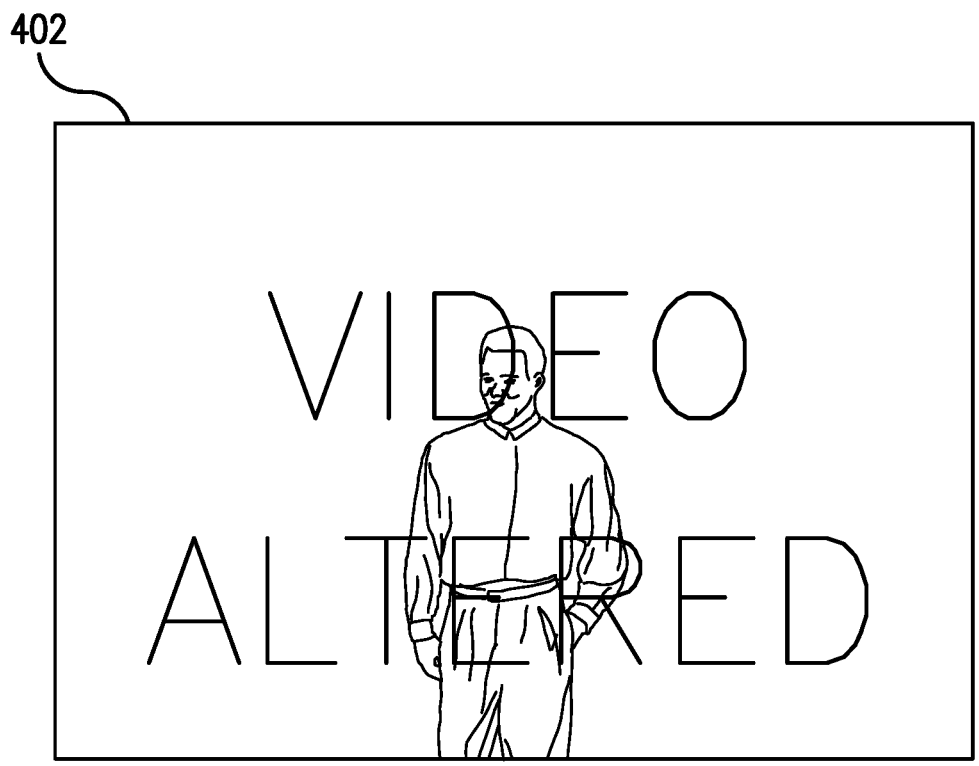
FIGS. 5A and 5B present examples in which the video authentication system of FIG. 1 modifies a target video to indicate that the target video is an altered version of a source video.
Figure 5B:
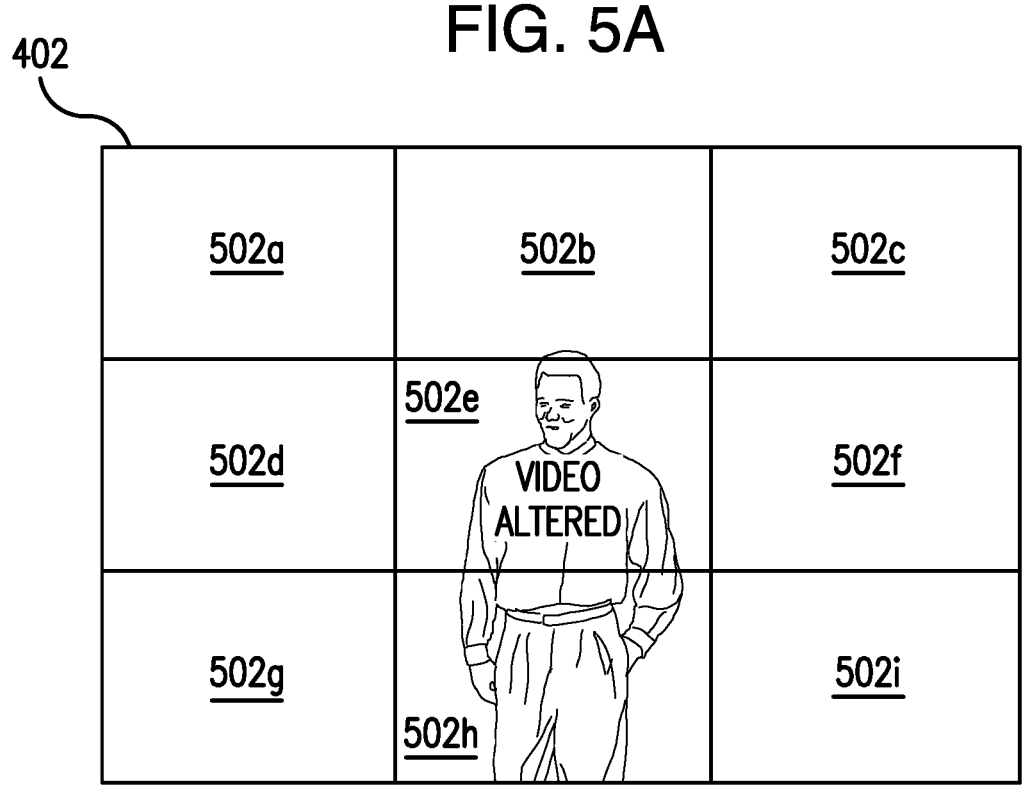

FIGS. 5A and 5B present examples in which authentication server 104 modifies a target video 137 to indicate that the target video is an altered version of a source video 114. FIGS. 5A and 5B both present a frame 402 from target video 137. As illustrated in FIG. 5A, in certain embodiments, authentication server 104 is configured to modify the full frame 402 to indicate that the frame has been altered and/or is part of a series of frames that includes one or more frames that have been altered in comparison to source video 114. As illustrated in FIG. 5B, in certain embodiments, authentication server 104 is configured to modify a region 502e of frame 402 to indicate that the region has been altered and/or is part of a series of regions 502e from a series of frames that includes one or more regions 502e that have been altered in comparison to source video 114. In certain embodiments, and as illustrated in FIGS. 5A and 5B, modifying frame 402 includes inserting text and/or a watermark in frame 402 to indicate that the frame and/or region 502e of the frame is associated with an alteration, as compared to source video 114. In certain embodiments, modifying frame 402 includes replacing frame 402 with the corresponding frame 202 from source video 114. In some embodiments, modifying frame 402 includes deleting frame 402 from target video 137. In certain embodiments, modifying frame 402 includes replacing frame 402 and/or region 502e with a set of uniform pixels (e.g., a set of white pixels, a set of black pixels, etc.).

As an example of the operation of authentication server 104 in modifying target video 137, in certain embodiments, in response to determining that hash value 410, generated from video segment 408 of target video 137, does not match hash value 208, generated from the corresponding video segment 206 of source video 114a, authentication server 104 modifies each frame of video segment 408 to indicate that one or more frames of video segment 408 have been modified as compared to the corresponding video segment 206 of source video 114a. As another example, in certain embodiments, in response to determining that hash value 410, generated from video segment 408 of target video 137, does not match hash value 208, generated from the corresponding video segment 206 of source video 114a, authentication server 104 further compares the hash values generated from the individual frames of video segment 408 and video segment 206, and modifies those frames of video segment 408 for which the corresponding hash values do not match. As another example, in certain embodiments, in response to determining that hash value 410, generated from video segment 408 of target video 137, does not match hash value 208, generated from the corresponding video segment 206 of source video 114a, authentication server 104 further compares the hash values generated from regions 502 of video segment 408 to the hash values generated from the corresponding regions of video segment 206, and modifies those regions 502 of video segment 408 for which the corresponding hash values do not match. Modifying specific regions 502 of target video 137 may be desirable to help determine whether target video 137 has been altered as a result of deepfake generation efforts, or for other reasons. For example, as illustrated in FIG. 5B, if authentication server 104 indicates that region 502e of target video 137, which includes the face of a high-level executive of an organization, has been altered, this likely points to an alteration associated with deepfake generation. On the other hand, if authentication server 104 indicates that certain regions 502 of target video 137, which include a banner of text, have been altered, this may point to an innocuous alteration, such as the insertion of an explanatory banner of text.

In certain embodiments, authentication server 104 is also configured to modify frames 402 of target video 137 to indicate that the audio associated with those frames has been modified as compared to the audio of source video 114a. For example, in response to determining that a hash value 414 generated from audio segment 412 of target video 137 does not match the hash value 214 generated from the corresponding audio segment 212 of source video 114a, authentication server 104 is configured to modify the frames 402 of the video segment 408 which is associated with audio segment 412, to indicate that the audio associated with the video segment has been altered.

Figure 6:
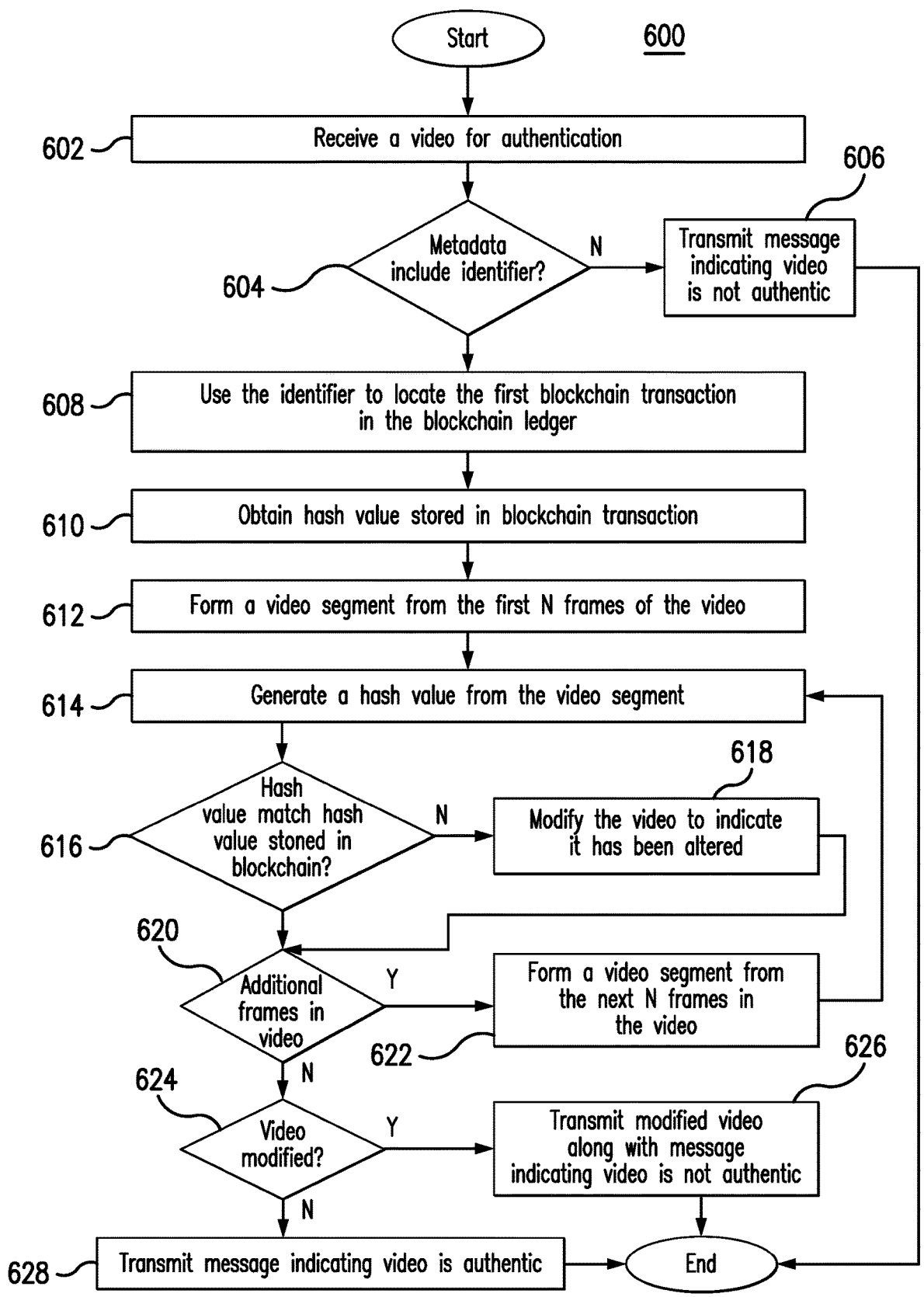
FIG. 6 presents a flowchart illustrating the process by which the authentication server of the video registration and authentication system of FIG. 1 uses the blockchain(s) in which an organization's source videos have been registered to determine whether a target video is authentic.

FIG. 6 presents a flowchart illustrating the process by which authentication server 104 uses blockchain 123 to determine whether or not target video 137 is an authentic copy of source video 114a. In step 602 authentication server 104 receives a request 136, from user 106, to authenticate target video 137. In certain embodiments, request 136 includes a copy of target video 137. In some embodiments, request 136 includes a link to a location of target video 137. In step 604 authentication server 104 determines whether the metadata 406 of target video 137 includes block identifier 218a. If, in step 604 authentication server 104 determines that the metadata 406 of target video 137 does not include block identifier 218a, in step 606 authentication server 104 transmits a message to user 106 indicating that target video 137 is not an authentic copy of source video 114a.

If, in step 604 authentication server 104 determines that metadata 406 includes identifier 218a, in step 608 authentication server 104 uses identifier 218a to locate the first block 124a in blockchain 123 that includes a blockchain transaction 140a associated with source video 114a. In step 610 authentication server 104 obtains hash value 208 stored in blockchain transaction 140. In step 612 authentication server 104 forms video segment 408 from the first N frames 402 of target video 137, in the same manner that registration server 102 formed video segment 206 from the first N frames 202 of source video 114a. In step 614 authentication server 104 generates hash value 410 from video segment 408, using hash function 130a. In step 616 authentication server 104 determines whether hash value 410 matches the corresponding hash value 208 stored in blockchain 123. If, in step 616 authentication server 104 determines that hash value 410 does not match the corresponding hash value 208 stored in blockchain 123, in step 618 authentication server 104 modifies target video 137 to indicate that it has been altered in comparison to source video 114a.

If, in step 616 authentication server 104 determines that hash value 410 matches the corresponding hash value 208 stored in blockchain 123, in step 620 authentication server 104 determines whether target video 137 includes additional frames 402. If, in step 620 authentication server 104 determines that target video 137 includes additional frames 402, in step 622 authentication server 104 forms a video segment 408 from the next N frames 402 of target video 137, in the same manner that registration server 102 formed the corresponding video segment 206 from frames 202 of source video 114a. If the number of additional frames 402 in target video 137 is less than N, authentication server 104 forms video segment 408 from the remaining frames 402 of target video 137. Authentication server 104 then returns to step 614.

If, in step 620 authentication server 104 determines that target video 137 does not include additional frames 402, in step 624 authentication server 104 determines whether or not it has modified target video 137. If, in step 624 authentication server 104 determines that it has modified target video 137, in step 626 authentication server 104 transmits modified target video 137 to user 106, along with message 138, indicating that target video 137 is not authentic. If, in step 624 authentication server 104 determines that it has not modified target video 137, in step 628 authentication server 104 transmits message 138 to user 106 indicating that target video 137 is authentic.

Modifications, additions, or omissions may be made to method 600 depicted in FIG. 6. Method 600 may include more, fewer, or other steps. For example, steps may be performed in parallel or in any suitable order. While discussed as authentication server 104 (or components thereof) performing the steps, any suitable component of system 100, such as device(s) 108, or nodes 120, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A video authentication system comprising:
a registration server configured to register a source video in a blockchain ledger, the registration server comprising:
a first memory configured to store:
a hash function configured to generate a hash value based on a set of pixels; and
the blockchain ledger comprising a plurality of blockchain transactions;
a first hardware processor communicatively coupled to the first memory, the first hardware processor configured to:
receive the source video comprising:
a first plurality of frames, each frame of the first plurality of frames comprising a plurality of pixels; and
a first set of metadata;
split the source video into a series of source video segments, the series of source video segments comprising a first source video segment, the first source video segment comprising a first set of sequential frames of the first plurality of frames, the first set of sequential frames of the first plurality of frames beginning at a starting timestamp, lasting a set time interval, and comprising a first set of pixels;
generate a first hash value based on the first video segment, the first hash value generated by applying the hash function to the first set of pixels;
generate a first blockchain transaction comprising the first hash value;
store the first blockchain transaction as a first block in the blockchain ledger;
obtain an identifier for the first block in the blockchain ledger; and
store the identifier in the first set of metadata; and
an authentication server configured to authenticate a target video by comparing the target video to the source video, the authentication server comprising:
a second memory configured to store the hash function; and a second hardware processor communicatively coupled to the second memory, the second hardware processor configured to:
receive, from a user device, a request to authenticate a first target video, the first target video comprising:
a second plurality of frames, each frame of the second plurality of frames comprising a plurality of pixels; and
a second set of metadata;
split the first target video into a series of target video segments, the series of target video segments comprising a first target video segment, the first target video segment comprising a first set of sequential frames of the second plurality of frames, the first set of sequential frames of the second plurality of frames beginning at the starting timestamp, lasting the set time interval, and comprising a second set of pixels;
generate a second hash value based on the first target video segment, the second hash value generated by applying the hash function to the second set of pixels;
determine that the second set of metadata comprises the identifier;
use the identifier to locate the first blockchain transaction in the blockchain ledger;
determine that the second hash value does not match the first hash value stored in the first blockchain transaction; and
in response to determining that the second hash value does not match the first hash value stored in the first blockchain transaction, transmit an alert to the user device indicating that the first target video is not authentic.

2. The video authentication system of claim 1, wherein:
the series of video segments further comprises a second video segment, the second video segment comprising a second set of sequential frames of the first plurality of frames, the second set of sequential frames of the first plurality of frames beginning at a second starting timestamp, lasting a second set time interval, and comprising a third set of pixels;
the series of target video segments further comprises a second target video segment, the second target video segment comprising a second set of sequential frames of the second plurality of frames, the second set of sequential frames of the second plurality of frames beginning at the second starting timestamp, lasting the second set time interval, and comprising a fourth set of pixels;
the first hardware processor is further configured to:
generate a third hash value based on the second video segment, the third hash value generated by applying the hash function to the third set of pixels;
generate a second blockchain transaction comprising the third hash value; and
store the second blockchain transaction as a second block in the blockchain ledger; and
the second hardware processor is further configured to:
generate a fourth hash value based on the second target video segment, the fourth hash value generated by applying the hash function to the fourth set of pixels; and
determine whether the fourth hash value matches the third hash value stored in the second blockchain transaction.

3. The video authentication system of claim 1, wherein:
the source video further comprises a first set of audio signals;
the first target video further comprises a second set of audio signals;
the first memory is further configured to store a second hash function configured to generate a hash value based on a set of audio signals;
the first hardware processor is further configured to:
split the first set of audio signals into a series of audio segments, the series of audio segments comprising a first audio segment, the first audio segment corresponding to the first video segment and comprising a first subset of sequential audio signals of the first set of audio signals; and
generate a third hash value based on the first audio segment, the third hash value generated by applying the second hash function to the first subset of sequential audio signals of the first set of audio signals;
the first blockchain transaction further comprises the third hash value; and
the second hardware processor is further configured to:
split the second set of audio signals into a series of target audio segments, the series of target audio segments comprising a first target audio segment, the first target audio segment corresponding to the first target video segment and comprising a first subset of sequential audio signals of the second set of audio signals;
generate a fourth hash value based on the first target audio segment, the fourth hash value generated by applying the second hash function to the first subset of sequential audio signals of the second set of audio signals; and
determine that the fourth hash value does not match the third hash value stored in the first blockchain transaction.

4. The video authentication system of claim 1, wherein in response to determining that the second hash value does not match the first hash value, the second hardware processor is further configured to modify the first target video to indicate that the first set of sequential frames of the second plurality of frames comprises frames that are not authentic.

5. The video authentication system of claim 4, wherein modifying the first target video to indicate that the first set of sequential frames of the second plurality of frames comprises frames which are not authentic comprises adding a watermark to each frame of the first set of sequential frames of the second plurality of frames.

6. The video authentication system of claim 1, wherein the second hardware processor is further configured to:
receive, from a second user device, a request to authenticate a second target video, the second target video comprising:
a third plurality of frames, each frame of the third plurality of frames comprising a plurality of pixels; and
a third set of metadata;
split the second target video into a second series of target video segments, the second series of target video segments comprising a first target video segment, the first target video segment comprising a first set of sequential frames of the third plurality of frames, the first set of sequential frames of the third plurality of frames beginning at the starting timestamp, lasting the set time interval, and comprising a third set of pixels;

generate a third hash value based on the first target video segment of the second series of target video segments, the third hash value generated by applying the hash function to the third set of pixels;

determine that the third set of metadata comprises the identifier;

use the identifier to locate the first blockchain transaction in the blockchain ledger;

determine that the third hash value matches the first hash value stored in the first blockchain transaction; and in response to determining that the third hash value matches the first hash value stored in the first blockchain transaction, transmit a message to the second user device indicating that the second target video is authentic.

7. The video authentication system of claim 1, wherein the second hardware processor is further configured to:

receive, from a second user device, a request to authenticate a second target video, the second target video comprising a third set of metadata;

determine that the third set of metadata does not comprise the identifier; and in response to determining that the third set of metadata does not comprise the identifier transmit a message to the second user device indicating that the second target video is not authentic.

8. A method comprising:

receiving a source video comprising:
  a first plurality of frames, each frame of the first plurality of frames comprising a plurality of pixels; and
  a first set of metadata;

in response to receiving the source video:
  splitting the source video into a series of source video segments, the series of source video segments comprising a first source video segment, the first source video segment comprising a first set of sequential frames of the first plurality of frames, the first set of sequential frames of the first plurality of frames beginning at a starting timestamp, lasting a set time interval, and comprising a first set of pixels;
  generating a first hash value based on the first source video segment, the first hash value generated by applying a hash function to the first set of pixels;
  generating a first blockchain transaction comprising the first hash value;
  storing the first blockchain transaction as a first block in a blockchain ledger;
  obtaining an identifier for the first block in the blockchain ledger; and
  storing the identifier in the first set of metadata;

receiving, from a user device, a request to authenticate a first target video, the first target video comprising:
  a second plurality of frames, each frame of the second plurality of frames comprising a plurality of pixels; and
  a second set of metadata; and in response to receiving the request to authenticate the first target video:
  splitting the first target video into a series of target video segments, the series of target video segments comprising a first target video segment, the first target video segment comprising a first set of sequential frames of the second plurality of frames, the first set of sequential frames of the second plurality of frames beginning at the starting timestamp, lasting the set time interval, and comprising a second set of pixels;
  generating a second hash value based on the first target video segment, the second hash value generated by applying the hash function to the second set of pixels;
  determining that the second set of metadata comprises the identifier;
  using the identifier to locate the first blockchain transaction in the blockchain ledger;
  determining that the second hash value does not match the first hash value stored in the first blockchain transaction; and
  in response to determining that the second hash value does not match the first hash value stored in the first blockchain transaction, transmitting an alert to the user device indicating that the first target video is not authentic.

9. The method of claim 8, wherein:

the series of video segments further comprises a second video segment, the second video segment comprising a second set of sequential frames of the first plurality of frames, the second set of sequential frames of the first plurality of frames beginning at a second starting timestamp, lasting a second set time interval, and comprising a third set of pixels;

the series of target video segments further comprises a second target video segment, the second target video segment comprising a second set of sequential frames of the second plurality of frames, the second set of sequential frames of the second plurality of frames beginning at the second starting timestamp, lasting the second set time interval, and comprising a fourth set of pixels; and the method further comprises:
  generating a third hash value based on the second video segment, the third hash value generated by applying the hash function to the third set of pixels;
  generating a second blockchain transaction comprising the third hash value;
  storing the second blockchain transaction as a second block in the blockchain ledger;
  generating a fourth hash value based on the second target video segment, the fourth hash value generated by applying the hash function to the fourth set of pixels; and
  determining whether the fourth hash value matches the third hash value stored in the second blockchain transaction.

10. The method of claim 8, wherein:

the source video further comprises a first set of audio signals;

the first target video further comprises a second set of audio signals; and the method further comprises:
  splitting the first set of audio signals into a series of audio segments, the series of audio segments comprising a first audio segment, the first audio segment corresponding to the first video segment and comprising a first subset of sequential audio signals of the first set of audio signals;
  generating a third hash value based on the first audio segment, the third hash value generated by applying the second hash function to the first subset of sequential audio signals of the first set of audio signals, wherein the first blockchain transaction further comprises the third hash value;
splitting the second set of audio signals into a series of target audio segments, the series of target audio segments comprising a first target audio segment, the first target audio segment corresponding to the first target video segment and comprising a first subset of sequential audio signals of the second set of audio signals;
generating a fourth hash value based on the first target audio segment, the fourth hash value generated by applying the second hash function to the first subset of sequential audio signals of the second set of audio signals; and
determining that the fourth hash value does not match the third hash value stored in the first blockchain transaction.

11. The method of claim 8, further comprising, in response to determining that the second hash value does not match the first hash value, modifying the first target video to indicate that the first set of sequential frames of the second plurality of frames comprises frames that are not authentic.

12. The method claim 11, wherein modifying the first target video to indicate that the first set of sequential frames of the second plurality of frames comprises frames which are not authentic comprises adding a watermark to each frame of the first set of sequential frames of the second plurality of frames.

13. The method of claim 8, further comprising:
receiving, from a second user device, a request to authenticate a second target video, the second target video comprising:
 a third plurality of frames, each frame of the third plurality of frames comprising a plurality of pixels; and
 a third set of metadata;
splitting the second target video into a second series of target video segments, the second series of target video segments comprising a first target video segment, the first target video segment comprising a first set of sequential frames of the third plurality of frames, the first set of sequential frames of the third plurality of frames beginning at the starting timestamp, lasting the set time interval, and comprising a third set of pixels;
generating a third hash value based on the first target video segment of the second series of target video segments, the third hash value generated by applying the hash function to the third set of pixels;
determining that the third set of metadata comprises the identifier;
using the identifier to locate the first blockchain transaction in the blockchain ledger;
determining that the third hash value matches the first hash value stored in the first blockchain transaction; and
in response to determining that the third hash value matches the first hash value stored in the first blockchain transaction, transmitting a message to the second user device indicating that the second target video is authentic.

14. The method of claim 8, further comprising:
receiving, from a second user device, a request to authenticate a second target video, the second target video comprising a third set of metadata;
determining that the third set of metadata does not comprise the identifier; and
in response to determining that the third set of metadata does not comprise the identifier transmitting a message to the second user device indicating that the second target video is not authentic.

15. A system comprising:
a first non-transitory computer-readable medium comprising first instructions that are configured, when executed by a first hardware processor, to:
 receive a source video comprising:
  a first plurality of frames, each frame of the first plurality of frames comprising a plurality of pixels; and
  a first set of metadata;
 split the source video into a series of source video segments, the series of source video segments comprising a first source video segment, the first source video segment comprising a first set of sequential frames of the first plurality of frames, the first set of sequential frames of the first plurality of frames beginning at a starting timestamp, lasting a set time interval, and comprising a first set of pixels;
 generate a first hash value based on the first video segment, the first hash value generated by applying a hash function to the first set of pixels;
 generate a first blockchain transaction comprising the first hash value;
 store the first blockchain transaction as a first block in a blockchain ledger;
 obtain an identifier for the first block in the blockchain ledger; and
 store the identifier in the first set of metadata; and
a second non-transitory computer-readable medium comprising second instructions that are configured, when executed by a second hardware processor, to:
 receive, from a user device, a request to authenticate a first target video, the first target video comprising:
  a second plurality of frames, each frame of the second plurality of frames comprising a plurality of pixels; and
  a second set of metadata;
 split the first target video into a series of target video segments, the series of target video segments comprising a first target video segment, the first target video segment comprising a first set of sequential frames of the second plurality of frames, the first set of sequential frames of the second plurality of frames beginning at the starting timestamp, lasting the set time interval, and comprising a second set of pixels;
 generate a second hash value based on the first target video segment, the second hash value generated by applying the hash function to the second set of pixels;
 determine that the second set of metadata comprises the identifier;
 use the identifier to locate the first blockchain transaction in the blockchain ledger;
 determine that the second hash value does not match the first hash value stored in the first blockchain transaction; and
 in response to determining that the second hash value does not match the first hash value stored in the first blockchain transaction, transmit an alert to the user device indicating that the first target video is not authentic.

16. The system of claim 15, wherein:
the series of video segments further comprises a second video segment, the second video segment comprising a second set of sequential frames of the first plurality of frames, the second set of sequential frames of the first plurality of frames beginning at a second starting timestamp, lasting a second set time interval, and comprising a third set of pixels;

the series of target video segments further comprises a second target video segment, the second target video segment comprising a second set of sequential frames of the second plurality of frames, the second set of sequential frames of the second plurality of frames beginning at the second starting timestamp, lasting the second set time interval, and comprising a fourth set of pixels;

the first instructions are further configured, when executed by the first hardware processor, to:
  generate a third hash value based on the second video segment, the third hash value generated by applying the hash function to the third set of pixels;
  generate a second blockchain transaction comprising the third hash value; and
  store the second blockchain transaction as a second block in the blockchain ledger; and the second instructions are further configured, when executed by the second hardware processor, to:
  generate a fourth hash value based on the second target video segment, the fourth hash value generated by applying the hash function to the fourth set of pixels; and
  determine whether the fourth hash value matches the third hash value stored in the second blockchain transaction.

17. The system of claim 15, wherein:
the source video further comprises a first set of audio signals;
the first target video further comprises a second set of audio signals;
the first instructions are further configured, when executed by the first hardware processor, to:
  split the first set of audio signals into a series of audio segments, the series of audio segments comprising a first audio segment, the first audio segment corresponding to the first video segment and comprising a first subset of sequential audio signals of the first set of audio signals; and
  generate a third hash value based on the first audio segment, the third hash value generated by applying a second hash function to the first subset of sequential audio signals of the first set of audio signals;
the first blockchain transaction further comprises the third hash value; and
the second instructions are further configured, when executed by the second hardware processor, to:
  split the second set of audio signals into a series of target audio segments, the series of target audio segments comprising a first target audio segment, the first target audio segment corresponding to the first target video segment and comprising a first subset of sequential audio signals of the second set of audio signals;
  generate a fourth hash value based on the first target audio segment, the fourth hash value generated by applying the second hash function to the first subset of sequential audio signals of the second set of audio signals; and
  determine that the fourth hash value does not match the third hash value stored in the first blockchain transaction.

18. The system of claim 15, wherein the second instructions are further configured to, when executed by the second hardware processor and in response to determining that the second hash value does not match the first hash value, modify the first target video to indicate that the first set of sequential frames of the second plurality of frames comprises frames that are not authentic.

19. The system claim 18, wherein modifying the first target video to indicate that the first set of sequential frames of the second plurality of frames comprises frames which are not authentic comprises adding a watermark to each frame of the first set of sequential frames of the second plurality of frames.

20. The system claim 15, wherein the second instructions are further configured, when executed by the second hardware processor, to:
  receive, from a second user device, a request to authenticate a second target video, the second target video comprising:
    a third plurality of frames, each frame of the third plurality of frames comprising a plurality of pixels; and
    a third set of metadata;
  split the second target video into a second series of target video segments, the second series of target video segments comprising a first target video segment, the first target video segment comprising a first set of sequential frames of the third plurality of frames, the first set of sequential frames of the third plurality of frames beginning at the starting timestamp, lasting the set time interval, and comprising a third set of pixels;
  generate a third hash value based on the first target video segment of the second series of target video segments, the third hash value generated by applying the hash function to the third set of pixels;
  determine that the third set of metadata comprises the identifier;
  use the identifier to locate the first blockchain transaction in the blockchain ledger;
  determine that the third hash value matches the first hash value stored in the first blockchain transaction; and
  in response to determining that the third hash value matches the first hash value stored in the first blockchain transaction, transmit a message to the second user device indicating that the second target video is authentic.

* * * * *